United States Patent
Anami

(10) Patent No.: US 10,802,888 B2
(45) Date of Patent: Oct. 13, 2020

(54) INFORMATION PROCESSING DEVICE AND COOPERATIVE DISTRIBUTED STORAGE SYSTEM

(71) Applicant: NEC Corporation, Tokyo (JP)

(72) Inventor: Shinichi Anami, Tokyo (JP)

(73) Assignee: NEC Corporation, Tokyo (JP)

( * ) Notice: Subject to any disclaimer, the term of this patent is extended or adjusted under 35 U.S.C. 154(b) by 166 days.

(21) Appl. No.: 15/510,982

(22) PCT Filed: Sep. 10, 2015

(86) PCT No.: PCT/JP2015/075744
§ 371 (c)(1),
(2) Date: Mar. 13, 2017

(87) PCT Pub. No.: WO2016/043120
PCT Pub. Date: Mar. 24, 2016

(65) Prior Publication Data
US 2017/0277574 A1  Sep. 28, 2017

(30) Foreign Application Priority Data
Sep. 19, 2014  (JP) .................................. 2014-191189

(51) Int. Cl.
*G06F 9/50* (2006.01)
*G06F 21/80* (2013.01)
(Continued)

(52) U.S. Cl.
CPC ............ *G06F 9/5077* (2013.01); *G06F 9/505* (2013.01); *G06F 9/5016* (2013.01);
(Continued)

(58) Field of Classification Search
None
See application file for complete search history.

(56) References Cited

U.S. PATENT DOCUMENTS

2007/0207729 A1* 9/2007 Chen .................. G06F 17/3056 455/15
2010/0095298 A1* 4/2010 Seshadrinathan ...... G06Q 10/10 718/100

(Continued)

FOREIGN PATENT DOCUMENTS

JP  2002-281021  9/2002
JP  2004-145755  5/2004
(Continued)

OTHER PUBLICATIONS

International Search Report dated Dec. 1, 2015, in corresponding PCT International Application.

*Primary Examiner* — Wynuel S Aquino
(74) *Attorney, Agent, or Firm* — Finnegan, Henderson, Farabow, Garrett & Dunner, L.L.P.

(57) ABSTRACT

In a network system that a plurality of information processing devices are connected via a network, an information processing device includes an information dividing part configured to generate a plurality of divided information by dividing user information, a state information acquisition part configured to acquire state information of the network system, and a destination determination part configured to determine a plurality of destinations for storing a plurality of divided information distributed thereto in response to variations of the state information. The destination determination part determines destinations based on network communication speed, physical distances between information processing devices, authentication methods applied to information processing devices, or free spaces of storage units of information processing devices. The information dividing part generates a plurality of divided information by dividing user information by predetermined data sizes or by categories.

11 Claims, 4 Drawing Sheets

(51) Int. Cl.
  *G06F 21/62* (2013.01)
  *G06F 11/14* (2006.01)
(52) U.S. Cl.
  CPC ........ *G06F 9/5055* (2013.01); *G06F 11/1464* (2013.01); *G06F 21/62* (2013.01); *G06F 21/80* (2013.01)

(56) References Cited

U.S. PATENT DOCUMENTS

| | | | | |
|---|---|---|---|---|
| 2011/0320400 | A1* | 12/2011 | Namini | G06F 17/30327 707/610 |
| 2012/0284229 | A1* | 11/2012 | Kim | H04L 67/1095 707/634 |
| 2013/0160141 | A1* | 6/2013 | Tseng | G06F 21/6245 726/28 |
| 2014/0068257 | A1* | 3/2014 | Burckard | G06F 21/6245 713/166 |
| 2014/0096267 | A1* | 4/2014 | Casso | G06F 21/6245 726/28 |
| 2014/0325212 | A1* | 10/2014 | Della Corte | G06F 21/6272 713/164 |
| 2015/0245216 | A1* | 8/2015 | Cohen | H04L 67/306 455/410 |
| 2015/0261455 | A1* | 9/2015 | Gough | H04L 69/40 714/6.24 |
| 2017/0230351 | A1* | 8/2017 | Hallenborg | G06F 21/31 |

FOREIGN PATENT DOCUMENTS

| | | |
|---|---|---|
| JP | 2006-127136 | 5/2006 |
| JP | 2006-189925 | 7/2006 |
| JP | 2006-309395 | 11/2006 |
| JP | 2007-140869 | 6/2007 |
| JP | 2008-191897 | 8/2008 |
| JP | 2010-146441 | 7/2010 |
| JP | 2014-6764 | 1/2014 |
| JP | 2014-16584 | 1/2014 |
| WO | WO 2014/129570 A1 | 8/2014 |

* cited by examiner

INFORMATION PROCESSING DEVICE AND COOPERATIVE DISTRIBUTED STORAGE SYSTEM

CROSS-REFERENCE TO RELATED PATENT APPLICATIONS

This application is a National Stage Entry of International Application No. PCT/JP2015/075744, filed Sep. 10, 2015, which claims priority from Japanese Patent Application No. 2014-191189, filed Sep. 19, 2014. The entire contents of the above-referenced applications are expressly incorporated herein by reference.

TECHNICAL FIELD

The present invention relates to a cooperative distributed storage system configured to distribute and store data in multiple devices and an information processing device configured to determine a destination for storing divided information.

The present application claims the benefit of priority on Japanese Patent Application No. 2014-191189 filed on Sep. 19, 2014, the subject matter of which is hereby incorporated herein by reference.

BACKGROUND ART

Conventionally, engineers have developed network computing and cloud computing to carry out information processing using multiple devices connected together. In addition, engineers have developed machine-to-machine technologies to mutually connect machines via networks without any intervention of humans; hence, engineers have developed the Internet of things (IoT) and edge computing connecting edge terminals via networks. Recently, many devices storing various data have been installed in companies and homes; hence, engineers have developed IoT technologies to carry out information processing using those devices connected via networks. However, those devices dispersedly located and installed in unmanned environments may suffer from a risk of being robbed by someone. In this connection, account authentication and access control may be insufficient to prevent information leakage from robbed devices; hence, it is necessary to develop security measures applicable to IoT technologies.

As a countermeasure against a risk that any devices dispersedly located at various places are physically robbed by someone, it is possible to distribute and store data in multiple devices. Using multiple devices configured to store divided data, it is possible to prevent the entirety of original data from being leaked even when any single device is robbed by someone. Various documents have been provided to disclose technologies of distributed storage of data.

Patent Literature 1 discloses a data distributed management method for encryption and disturbed storage of data with computers (CPUs) which are randomly selected from among multiple computers connected via networks. Patent Literature 2 discloses a data distributed storage method that original data are divided into multiple data fragments and then stored in multiple storage devices. This document refers to a technology for encryption and disturbed storage of data and a technology for checking the existence/absence of forgery committed to data fragments by use of hash values in distributed storage. Patent Literature 3 discloses an electronic information management method that a client device processes personal information according to predetermined dividing-and-combining rules, converts personal information into multiple data, distributes and stores multiple data in multiple databases, thus reducing a risk of leaking personal information. Patent Literature 4 discloses a data distributed storage system, concerning a data distributed storage system including a server and multiple client devices, that single data is divided into multiple data and stored in client devices. Patent Literature 5 discloses a data dividing-and-restoring method that, when original data is distributed and stored in multiple storage devices, a first data string is generated by dividing the distributed-and-stored data; the first data string is converted into a second data string based on a predetermined key and an identification; and then the second data string is divided by the number of storage devices so as to generate divided data.

CITATION LIST

Patent Literature

Patent Literature 1: Japanese Patent Application Publication No. 2002-281021
Patent Literature 2: Japanese Patent Application Publication No. 2006-127136
Patent Literature 3: Japanese Patent Application Publication No. 2007-140869
Patent Literature 4: Japanese Patent Application Publication No. 2008-191897
Patent Literature 5: Japanese Patent Application Publication No. 2014-16584

SUMMARY OF INVENTION

Technical Problem

In the field of IoT technologies, various devices should handle multiple types of data, which in turn cause enormous amounts of data subjected to information processing. Due to various causes such as implementation of services requiring immediacy and services requiring cooperation with other systems, any devices connected via networks should be dynamically changed in their arrangement and configuration. To distribute and store data with multiple devices connected via networks, it is necessary to determine which device should store divided data. The conventional data distributed storage method does not assume any change of devices, serving as destinations of storing divided data, in their arrangement and configuration.

The present invention aims to solve the aforementioned problem and to provide a cooperative distributed storage system following any change occurring in devices, serving as destinations of storing data, in their arrangement and configuration and an information processing device for dynamically determining destinations for storing divided information.

Solution to Problem

The present invention is applied to a network system that a plurality of information processing devices are connected via a network. In a first aspect of the invention, an information processing device includes an information dividing part configured to generate a plurality of divided information by dividing predetermined information; a state information acquisition part configured to acquire state information of the network system; and a destination determination part configured to determine a plurality of destinations used to store a plurality of divided information distributed thereto in response to variations of the state information.

In a second aspect of the invention, an information processing device includes an information acquisition part configured to acquire video data capturing an image of a user; an extraction part configured to extract predetermined information from the video data; and a storage controller configured to distribute and store the predetermined information at a plurality of destinations. The storage controller generates a data map correlating the divided information and its destination so as to transmit the data map and the divided information to a server terminal device.

A third aspect of the invention is directed to an information distributed storage system that a plurality of information processing devices are connected to a server terminal device via a network. The information processing device includes an information acquisition part configured to acquire video data capturing an image of a user; an extraction part configured to extract user information from the video data; and a storage controller configured to distribute and store the user information at a plurality of destinations. The storage controller generates a data map correlating the divided information and its destination so as to transmit the data map and the divided information to a server terminal device. The server terminal device receives the data map and a plurality of divided information from a plurality of information processing devices so as to restore a plurality of divided information into the user information based on the data map.

A fourth aspect of the invention is directed to an information processing method including the steps of: generating a plurality of divided information by dividing predetermined information; acquiring state information of a network system; and determining a plurality of destinations used to store a plurality of divided information distributed thereto in response to variations of the state information.

A fifth aspect of the invention is directed to a program implemented by a computer of an information processing device including the steps of: generating a plurality of divided information by dividing predetermined information; acquiring state information of a network system; and determining a plurality of destinations used to store a plurality of divided information distributed thereto in response to variations of the state information.

Advantageous Effects of Invention

The present invention is able to prevent leakage of information due to robbery of information processing devices and to improve security performance such that user information is divided depending on any change of information processing devices serving as destinations of storing information in a network system, in their arrangement and configuration, into multiple pieces of divided information, and then multiple pieces of divided information are distributed and stored at multiple destinations.

DESCRIPTION OF EMBODIMENTS

The present invention concerning an information processing device and a cooperative distributed storage system will be described in detail by way of examples with reference to the accompanying drawings. The embodiment of the present invention employs an information processing device such as an edge terminal device connected to a network.

Figure 1:
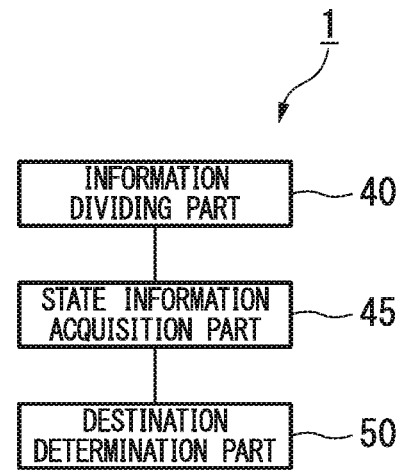
FIG. 1 is a block diagram showing the minimum configuration of an edge terminal device according to the embodiment of the present invention.

FIG. 1 is a block diagram showing the minimum configuration of an edge terminal device 1 according to the embodiment of the present invention. The edge terminal device 1 includes an information dividing part 40, a state information acquisition part 45, and a destination determination part 50. In addition, a plurality of edge terminal devices 1 are connected together via networks.

The information dividing part 40 divides the stored information of the edge terminal device 1 into divided information. Specifically, the stored information used in the present embodiment refers to any information including secured contents such as personal information (hereinafter, referred to as user information). The state information acquisition part 45 acquires the state information of a network system including edge terminal devices (i.e. the edge terminal device 1 and other edge terminal devices) connected together via networks. Herein, the state information refers to the arrangement of devices configuring a network system, a network communication speed, an authentication method for each edge terminal device, a free storage capacity of each edge terminal device, and the like. The destination determination part 50 dynamically determines an edge terminal device used to store divided information among a plurality of edge terminal devices connected together via networks.

Figure 2:
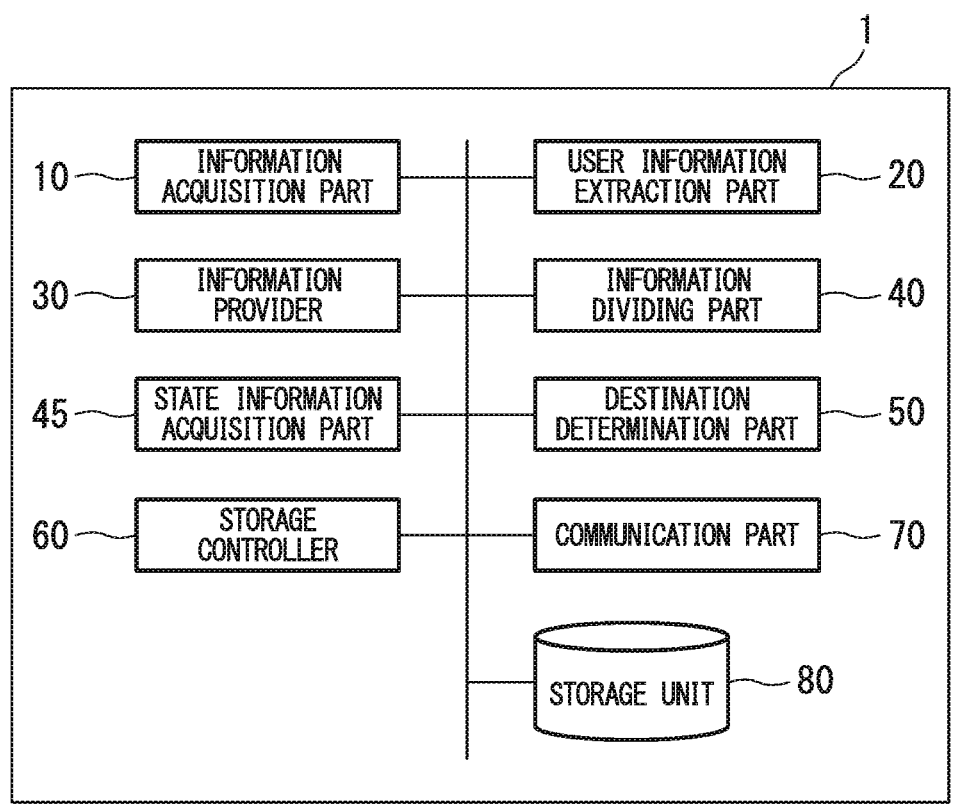
FIG. 2 is a block diagram showing the detailed configuration of an edge terminal device according to the embodiment of the present invention.

FIG. 2 is a block diagram showing the detailed configuration of the edge terminal device 1. The edge terminal device 1 includes an information acquisition part 10, a user information extraction part 20, an information provider 30, an information dividing part 40, a state information acquisition part 45, a destination determination part 50, a storage controller 60, a communication part 70, and a storage unit 80.

The information acquisition part 10 acquires various data (i.e. real world information) concerning user behaviors and environments surrounding users from user-owned terminal devices and terminal devices disposed at user's locations (hereinafter, referred to as an end terminal device 2) so as to store those data in the storage unit 80. For example, the real world information refers to video data capturing an image of user. The user information extraction part 20 extracts user information from the real world information which is stored in the storage unit 80 by the information acquisition part 10. For example, the user information refers to personal information, such as names, ages, and sexes of users reflected on video data, as well as user behavior information. For example, the user behavior information refers to user's clothes, existence/absence of their partners, actions of users holding commodities with their hands, commodities held by users with their hands, directions of user's sight lines, and the like. The user information extraction part 20 stores user information, which is extracted using an image recognition technique, in the storage unit 80.

The information provider 30 determines provider information depending on user information extracted by the user information extraction part 20 so as to transmit it to the end terminal device 2 connected to the edge terminal device 1. For example, the provider information depending on the user information refers to advertisement information that is provided to a user, located in a commodity selling place, who is selecting any commodity in the selling place. The storage controller 60 executes a distributed storage process for user information. In the distributed storage process, the user information stored in the storage unit 80 of the edge terminal device 1 connected to the user's end terminal device 2 is divided into multiple pieces of divided information, and then those pieces of divided information are distributed and stored in storage units of edge terminal devices. The communication part 70 executes a communication process and an authentication process with other devices. The storage unit 80 stores real world information, user information, divided information, provider information, and the like. The storage unit 80 includes a temporary storage unit such as volatile memory, and a secondary storage unit such as a non-volatile hard-disk drive. In this connection, a CPU (Central Processing Unit) of the edge terminal device 1 executes predetermined programs so as to implement the functions as the user information extraction part 20, the information provider 30, the information dividing part 40, the state information acquisition part 45, the destination determination part 50, and the storage controller 60.

Figure 3:
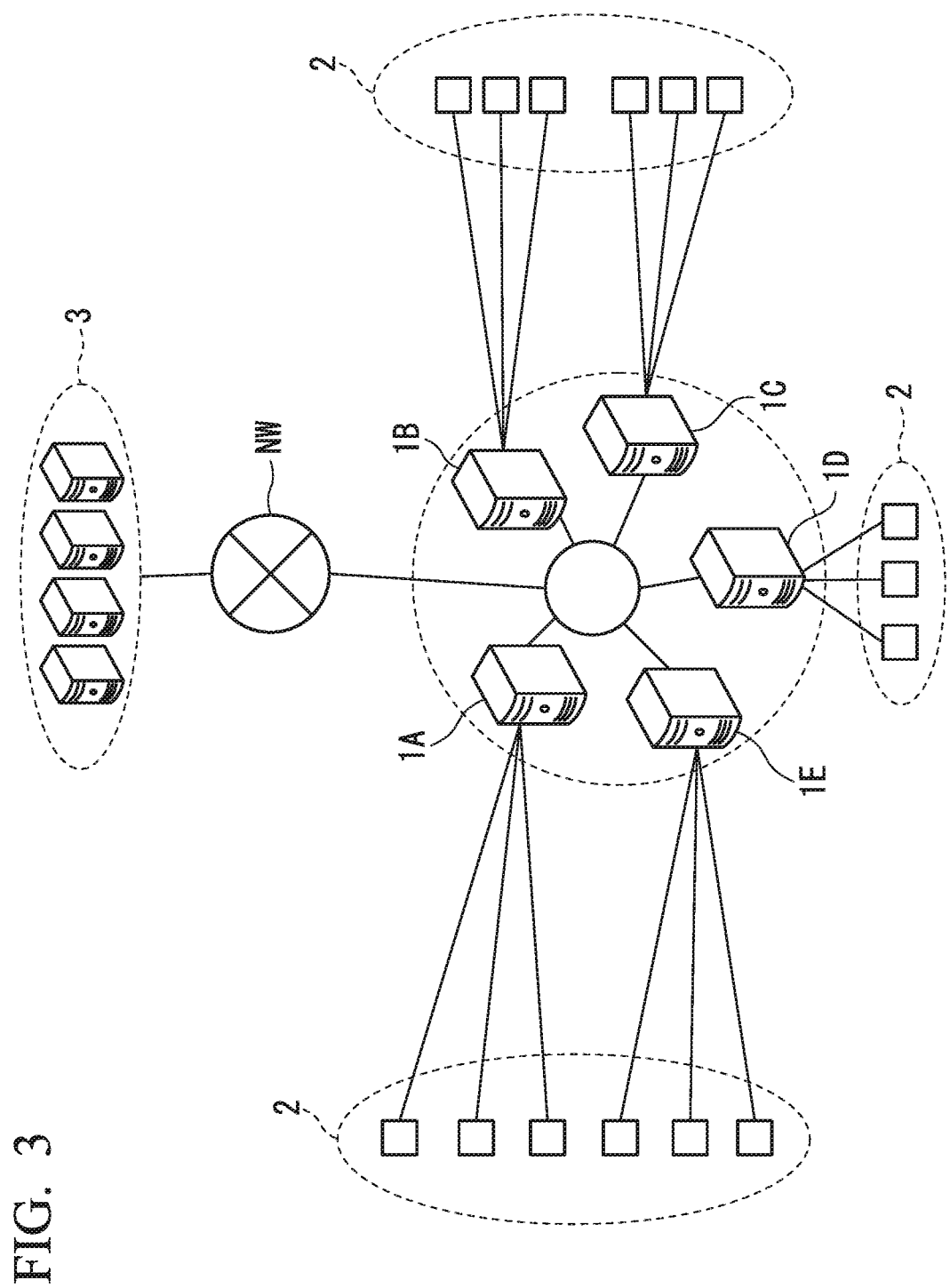
FIG. 3 is a schematic diagram showing the outline of a network system including multiple edge terminal devices according to the embodiment of the present invention.

FIG. 3 is a schematic diagram showing the outline of a network system including a plurality of edge terminal devices according to the embodiment of the present invention. In the network system, a plurality of edge terminal devices 1 (e.g. five edge terminal devices 1A, 1B, 1C, 1D, 1E) and a single server terminal device 3 are connected to a network NW such as the Internet, wherein each edge terminal device 1 is connectible to a plurality of end terminal devices 2.

The end terminal device 2 refers to sensors such as image sensors (cameras), vibration sensors, and temperature sensors used to acquire user information and information of user's surrounding environments as well as terminal devices such as PC terminals, tablet terminals, and POS terminals. Alternatively, the end terminal device 2 refers to display devices and projectors used for digital signage for providing information to users. The end terminal device 2 is located close to a user.

The edge terminal device 1 is an information processing device such as a PC server, which is located at any position relatively close to a user such as the rear face of a display device serving as the end terminal device 2 and user's feet. The edge terminal device 1 is connected to at least a single end terminal device 2 so as to acquire video data captured by an image sensor or measurement data measured by a vibration sensor, a temperature sensor, or the like. In addition, the edge terminal device outputs to a display device or the like the provider information based on the user information extracted from the real world information. Moreover, the edge terminal device 1 is connected to the server terminal device 3 through the network NW so as to transmit divided information, dividing user information, to the server terminal device 3 at the predetermined timing.

The server terminal device 3 is an information processing device such as a PC server, for example, which is located at a data center. The server terminal device 3 is a cloud-side server terminal device in cloud computing. The server terminal device 3 receives divided information from the edge terminal device 1 so as to restore and store user information. The server terminal device 3 carries out data analysis with enormous amounts of information stored therein. For example, the server terminal device 3 predicts user's consumption behaviors. In addition, the server terminal device 3 constructs new analysis rules for determining the provider information based on the user information in the edge terminal device 1. The server terminal device 3 constructs new analysis rules so as to transmit those rules to the edge terminal device 1. Compared with conventional rules for determining commodities recommended to users depending on their ages and sexes, for example, new analysis rules involve clothes as new parameters so as to determine commodities recommended to users depending on their ages, sexes, and clothes.

The edge terminal device 1 receives analysis rules from the server terminal devices 3 so as to store those rules in the storage unit 80. The edge terminal device 1 acquires the real world information from the end terminal device 2 so as to analyze it according to analysis rules. For example, the edge terminal device 1 outputs advertisement information, suited to a user reflected on video data acquired by the information acquisition part 10, with a display device (or the end terminal device 2) located at a position easily catching user's eyes in real time.

Video data capturing user's images have enormous amounts of data. The following description assumes a system that video information captured by the end terminal device 2 is directly transmitted to the server terminal device 3 at a data center; the server terminal device 3 carries out data analysis so as to determine provider information; thereafter, the provider information is transmitted to a display device. This system undergoes suppression in network bands, delays in network communications, and delays due to data analysis processes, thus causing a high possibility of delay providing information to users. In addition, it is not preferable to transmit information through external networks such as the Internet in terms of security since the edge terminal device 1 acquires information including numerous personal information.

To solve the above drawback, the present embodiment is designed to interpose the edge terminal device 1 between the end terminal device 2 and an external network so as to prevent delays in network communications and processing delays while preventing leakage of personal information, thus securing sufficient response performance.

In the network system of FIG. 3, the edge terminal device 1A completes extracting user information, divides user information into small units so as to generate multiple pieces of divided information, and then distributes and stores the divided information with a plurality of edge terminal devices (i.e. the edge terminal device 1A, and another edge terminal device selected from among other edge terminal devices 1B to 1E). Thus, it is possible to prevent the entirety of user information from being leaked to anybody irrespective of robbery of the edge terminal device 1A. In addition, it is possible to avoid any damage due to leakage of user information since a plurality of edge terminal devices 1 are used to transmit divided information to the server terminal device 3. In this connection, the edge terminal device 1A divides user information depending on the arrangement and the number of edge terminal devices 1 included in a network system so as to generate multiple pieces of divided information, thus selecting a plurality of edge terminal devices 1 user to store multiple pieces of divided information.

Next, the distributed storage process of divided information with the edge terminal device 1 will be described below.

Figure 4:
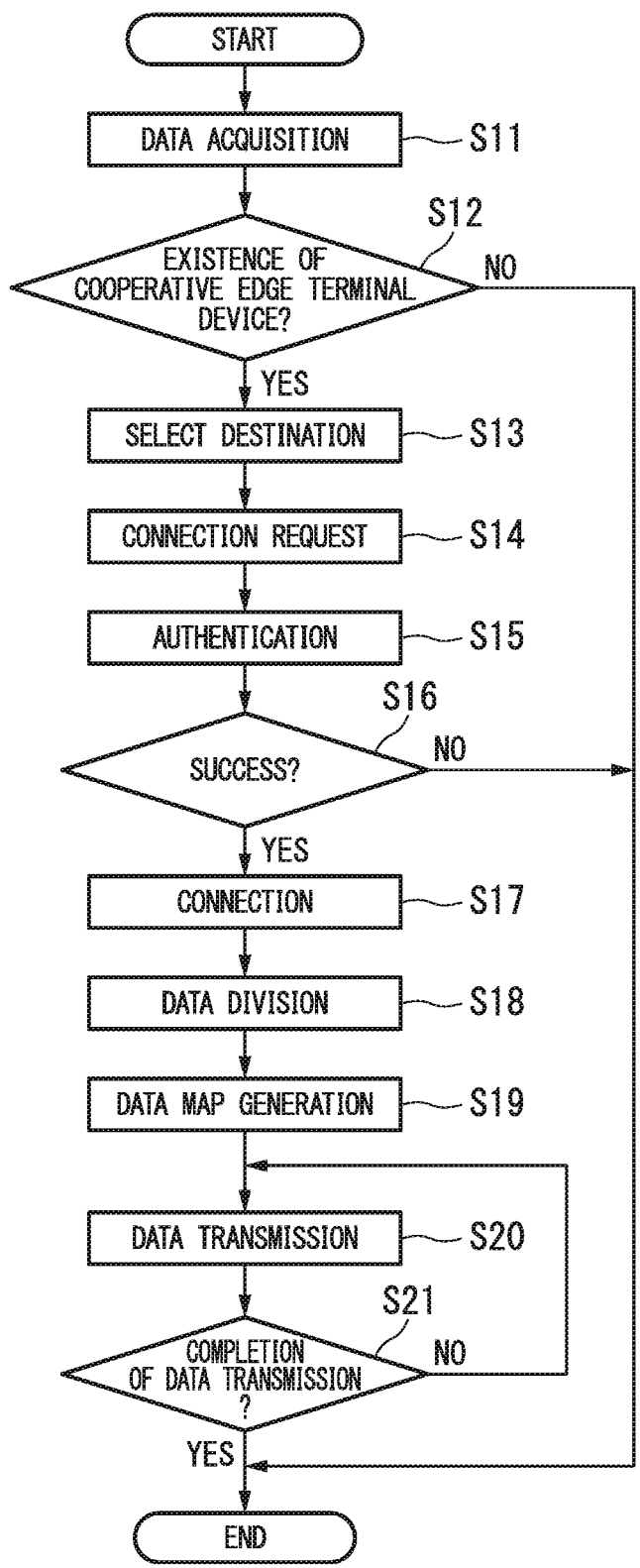
FIG. 4 is a flowchart showing a distributed storage process of divided information with the edge terminal device according to the embodiment of the present invention.

FIG. 4 is a flowchart showing the distributed storage process of divided information with the edge terminal device 1 according to the embodiment of the present invention. The processing of the edge terminal device 1 having user information before dividing will be described with reference to FIG. 4. In FIG. 3, it is assumed that the edge terminal device 1A having user information may determine other edge terminal devices 1B to 1E as candidates of distributed storage destinations for user information. In addition, the reference signs designating the constituent elements of the edge terminal device 1A (see FIG. 2) will be annotated by a letter "A".

In the edge terminal device 1A, the information acquisition part 10A acquires the real world information including the user information from the end terminal device 2 (step S11). The information acquisition part 10A writes the real world information into a temporary storage of the storage unit 80A. Next, the user information extraction part 20A reads the real world information from the storage unit 80A so as to extract the user information from the real world information. In the case of the real world information serving as video data, for example, an image recognition technique is used to extract user's age, sex, clothes, the existence/absence of user's partner, the length of user's stay, user's behavior, and the like. Assuming that various pieces of information such as user's face, shape, name, address, and telephone number are registered in a predetermined storage device in advance, it is possible to determine matching with user information by use of an image recognition technique, and therefore it is possible to obtain information such as the name and the address of a user reflected on video data. The user information extraction part 20A writes the user information into a temporary storage of the storage unit 80A. Next, the information provider 30A reads the user information from the storage unit 80A so as to carry out an analysis process according to analysis rules obtained from the server terminal device 3, thus determining information provided to a user. It is possible to determine which information should be specifically provided to a user according to analysis rules. The analysis rules obtained from the server terminal device 3 are stored in the storage unit 80A in advance. The information provider 30A reads advertisement information, which should be provided to a user, from the storage unit 80A or an external storage unit so as to output the advertisement information to a display device (e.g. the end terminal device 2).

Upon completing outputting information provided to a user, the edge terminal device 1 transmits the user information to the server terminal device 3 in a data center at the preferable timing in order to construct new analysis rules. However, some place or some region locating the edge terminal device 1 may not have any margins in network bands. In addition, it is likely that enormous amounts of user information will be generated depending on the number of edge terminal devices 2 and image sensors (e.g. the end terminal devices 2) or the number of visitors. In this case, it is likely that excessive communication loads will be normally applied to the network NW when the edge terminal device 1 extracts the user information from the real world information so as to immediately transmit the user information to the server terminal device 3. Considering communication loads and capacities of network environments, for example, the network system of the present embodiment is designed such that the edge terminal device 1 transmits user information to the server terminal device 3 at predetermined times such as once in several hours and once in a day.

The user information extraction part 20A writes the user information into a secondary storage of the storage unit 80A since it is necessary to hold the user information until the edge terminal device 1 successfully transmits the user information to the server terminal device 3. This guarantees that the user information is stored in the secondary storage of the storage unit 80A until the edge terminal device 1A extracts the user information so as to transmit the user information to the server terminal device 3. In this connection, the edge terminal device 1 may be located at a commercial facility, relatively close to a place of arranging sensors and display devices, instead of a firmly-secured data center. At this location, it is assumed that a malicious user could take away the edge terminal device 1A while staff takes their eyes off the edge terminal device 1A. When the edge terminal device 1A is taken away by a third party, it is likely that the user information stored in the edge terminal device 1A would be leaked to any outsider. As a countermeasure against robbery in the duration that the edge terminal device 1A successfully transmits the user information to the server terminal device 3, the present embodiment carries out a distributed storage process for dividing, distributing, and storing user information with a plurality of edge terminal devices 1 in step S12 and its subsequent steps.

Upon completion of outputting information provided to a user, the information provider 30 sends a completion signal to the storage controller 60. The storage controller 60 starts the distributed storage process of user information. First, the storage controller 60 instructs the state information acquisition part 45 to confirm the state information of a network system. The state information acquisition part 45 confirm the existence of a cooperative edge terminal device The cooperative edge terminal device refers to the edge terminal device 1 serving as a destination candidate for storing divided information dividing user information.

For example, it is possible to confirm the existence of a cooperative edge terminal device such that the state information acquisition part 45 makes an inquiry for each IP address with reference to a list of IP addresses of cooperative edge terminal devices so as to confirm whether or not to receive any reply. It is possible to obtain a list of IP addresses of cooperative edge terminal devices from a management device implementing configuration management of a network system. Alternatively, it is possible for the state information acquisition part 45 to search through the network NW so as to obtain IP addresses assigned to the same network. This makes it possible to select destinations depending on the allocation of the edge terminal device 1. The edge terminal device 1 exits the distributed storage process upon confirming non-existence of any cooperative edge terminal device (step S12; "NO").

Upon confirming the existence of one or more cooperative edge terminal devices (step S12; "YES"), the state information acquisition part 45 provides a list of cooperative edge terminal devices to the destination determination part 50 so as to instruct it to determine destinations of storing divided information. The above list includes host names and IP addresses of cooperative edge terminal devices.

Next, the destination determination part 50 selects destinations of storing divided information, derived from user information, from among cooperative edge terminal devices (step S13). It is possible to name the following methods as the method of selecting destinations of divided information.
(1) Destination Selecting Method Based on Network Communication Speed First, the destination determination part 50 instructs the state information acquisition part 45 to acquire network communication speed. For example, the state information acquisition part 45 detects network communication speed between the edge terminal device 1A and the other edge terminal device 1$x$ ($x$: B to E) by way of a "ping" command or the like, and therefore the state information acquisition part 45 selects a destination connected to a network having high communication speed so as to store divided information at the destination. In this connection, it is possible to store large-size divided information with a destination connected to a network having high communication speed while storing small-size divided information with a destination connected to a network having low communication speed. The destination determination part 50 determines destinations depending on the number of dividing user information (i.e. the number of divided information). When user information is divided into four pieces, for example, the destination determination part 50 selects three destinations (i.e. edge terminal devices 1$x$) counted from a destination connected to a network having high communication speed. The largest-size divided information is immediately stored in the edge terminal device 1A, while the edge terminal device 1$x$ connected to a network having the highest communication speed is selected as a destination for storing the next larger-size divided information. For this reason, the storage unit 80A stores the correlation between multiple destinations and sizes of divided information. According to this method, it is possible to equalize transfer times of divided information so as to suppress impacts to network traffic.

(2) Destination Selecting Method Based on Physical Distance

According to this method, the edge terminal device 1 having a long physical distance from the predetermined edge terminal device 1 is selected to store divided information. First, the destination determination part 50 instructs the state information acquisition part 45 to acquire physical distances between edge terminal devices and their positional information. When physical distances between edge terminal devices are stored in the storage unit 80A of the edge terminal device 1A in advance, for example, the state information acquisition part 45A reads and outputs physical distances to the destination determination part 50A. When each edge terminal device 1 is equipped with a positioning sensor such as a GPS receiver, the state information acquisition part 45A acquires positional information, measured by a positioning sensor, so as to acquire and output the positional information of each edge terminal device 1 to the destination determination part 50A. Alternatively, when the server terminal device 3 has a storage unit (not shown) to store positional information of each edge terminal device, the state information acquisition part 45A acquires positional information of each edge terminal device 1 from the server terminal device 3 via the communication part 70A so as to output the positional information to the destination determination part 50A. The destination determination part 50A selects a plurality of edge terminal devices 1 (the number of which is identical to the number of divided information) with physical distances equal to or more than a predetermined value. The destination determination part 50A stores a group of destinations with the storage unit 80A. Considering a low possibility that the edge terminal devices 1 physically distanced from each other would be simultaneously robbed by someone, it is possible for this method to further improve security performance. In this connection, when multiple pieces of divided information are stored in the same group of edge terminal devices 1 every time of storing divided information, it is likely for someone to steal those edge terminal devices 1 so as to restore user information; hence, it is possible to minimally include at least one edge terminal device 1, which differs from the previously selected ones, in a group of destinations at the next time of selecting destinations. When it is difficult to increase physical distances between edge terminal devices to be equal to or more than a predetermined value at the timing of selecting destinations, it is possible to select a combination of destinations maximizing the number of edge terminal devices 1 with physical distances equal to or larger than a predetermined value.

(3) Destination Selecting Method According to Authentication Method

According to this method, a plurality of edge terminal devices 1 having different authentication methods are selected to store divided information. As different authentication methods, for example, it is possible to employ an ID/password authentication method between the edge terminal devices 1A and 1B while it is possible to employ an IC-card authentication method between the edge terminal devices 1A and 1C. As other authentication methods, it is possible to name one-time password authentication, biometric authentication (fingerprints, veins, faces, retinas, irises, voices, etc.), and CAPTCHA authentication. These methods may server as effective security measures against a situation that a malicious third party intrudes a network system and a situation that a malicious employee illegally acquires data at a local site. According to this method, even when a malicious employee logs in the edge terminal device 1A, accesses the other edge terminal devices 1B, 1C, and copies divided information, it takes a long time to access other edge terminal devices due to different authentication methods of edge terminal devices; hence, it is highly likely that a malicious employee would fail to obtain the entirety of divided information. In this connection, it is possible to make the setting that the edge terminal device 1A can solely access the edge terminal device 1B while the edge terminal device 1B can solely access the edge terminal device 1C. This setting prevents a malicious employee from accessing the edge terminal device 1C by the edge terminal device 1A. By additionally making the setting of limiting access routes, it is possible to increase the possibility of having a malicious employee resign illegal acquisition of data, thus improving security performance.

According to the above method, it is possible to determine and store authentication methods between edge terminal devices and access routes to edge terminal devices with the storage unit 80A in advance. In this case, the destination determination part 50A instructs the state information acquisition part 45A to acquire authentication methods of edge terminal devices. The state information acquisition part 45A reads authentication methods of edge terminal devices from the storage unit 80A so as to output them to the destination determination part 50A. The destination determination part 50A selects a plurality of edge terminal devices 1A having different authentication methods. The following description will give consideration to the setting of the edge terminal devices 1A to 1D such that the edge terminal device 1A employs a password authentication method; the edge terminal devices 1B, 1C employ an IC-card authentication method; the edge terminal device 1D employs a one-time password authentication method. In this case, the destination determination part 50A of the edge terminal device 1A selects the edge terminal devices 1A, 1B, 1D. In addition, the destination determination part 50A determines destinations to include any edge terminal device 1 that is not directly accessible thereto.

(4) Destination Selecting Method Based on Free Space

According to this method, edge terminal devices having large free spaces are selected by referring to free spaces of storage units of edge terminal devices so as to store divided information. For example, the state information acquisition part 45A of the edge terminal device 1A inquires the other edge terminal devices 1B to 1E about their free spaces so as to send their replies to inquiries to the destination determination part 50A. The destination determination part 50A selects destinations depending on replies to inquiries about free spaces. When user information is divided into four pieces, for example, the destination determination part 50A selects three destinations in the order of edge terminal devices having larger free spaces, and therefore the destination determination part 50A stores four pieces of divided information with the edge terminal device 1A and the edge terminal devices 1x selected as three destinations. Herein, it is possible to change the size of divided information depending on the size of free space. That is, it is possible to allocate large-size divided information to an edge terminal device having a large free space while allocating small-size divided information to an edge terminal device having a small free space. The destination determination part 50A stores the correlation between the edge terminal devices, which are selected as destinations, or the destinations and the sizes of divided information with the storage unit 80A. According to this method that is able to equalize free spaces of storage units among edge terminal devices, it is possible to store multiple pieces of divided information within the range of the total capacity aggregating all the storage units of edge terminal devices, and therefore it is possible to effectively use the limited hardware resources.

It is possible to check (health-check) a health condition of the storage unit 80 of the edge terminal device (e.g. HDD) by use of some tool, thus precluding an edge terminal device having an HDD of a bad health condition from a group of selected destinations. Alternatively, it is possible to determine network stability depending on a status of responding to a "ping" command which is transmitted between edge terminal devices at predetermined time intervals, selecting edge terminal devices as destinations by circumventing an unstable network pathway. In addition, it is possible to randomly select destinations from among a plurality of edge terminal devices. Moreover, it is possible to use all the cooperative edge terminal devices as destination candidates. Alternatively, it is possible to change the number of destinations every time divided pieces of user information are stored in a plurality of edge terminal devices. It is possible to determine the number of destinations together with a dividing method of user information in advance. Alternatively, it is possible for the destination determination part 50A of the edge terminal device 1A to arbitrarily determine the number of destinations, thus correspondingly determining the number of divided pieces of user information.

Referring back to FIG. 4, the destination determination part 50A of the edge terminal device 1A determines and records another edge terminal device as a destination, and then the storage controller 60A sends a connection request to the destination (step S14). Thus, the edge terminal device 1x (1x: 1B to 1E) serving as a destination sends back a request for authentication information. The storage controller 60A gets authentication by transmitting authentication information, e.g. a password, to the edge terminal device 1x serving as a destination (step S15). For example, it is possible to make an authentication request every time the edge terminal device 1A is connected to the edge terminal device 1x. Alternatively, it is possible to stop making an authentication request again within twenty-four hours after successful getting authentication. Upon failing to get authentication (step S16: NO), the edge terminal device 1A exits the distributed storage process. Upon successfully getting authentication (step S16: YES), the edge terminal device 1A is connected to the edge terminal device 1x serving as a destination (step S17). Thereafter, the information dividing part 40A divides user information (step S18). As a dividing method of user information, it is possible to name the following methods.

(1) Diving Method Using Data Size

This method divides user information by way of a certain data size (e.g. 1 byte). It is possible to improve security performance by dividing user information in meaningless units of information.

(2) Dividing Method Using Category

This method divides user information by way of categories such as user's names, ages, and sexes.

(3) Dividing Method Using Data Size and Category (Part 1)

This method further divides user information by way of data sizes (e.g. 1-byte units, or half-data units) after dividing user information by way of categories.

(4) Dividing Method Using Data Size and Category (Part 2)

This method further divides and then integrates data after dividing data by the above dividing method (3). In the case of user information representing a string of characters (e.g. five characters and two alphanumeric characters such as "PGTR35M" including "PGTR" as pseudonym of Japanese male name "Patent-Grant Taro", and "M" as "Man"), for example, this method divides the user information by way of categories, i.e. "PGTR" (category: name), "35" (category: age), and "M" (category: sex). This method further divides the divided information for each category in 2-byte units, i.e. "P", "G", "T", "R", "3", "5", and "M". Next, this method integrates 2-byte units of divided data, i.e. "XT", "G", "T", "R", "3", "5", and "MY". Herein, "X" denotes the sex of user information preceding the user information "PGTR35M" while "Y" denotes a 2-byte character as the name of user information subsequent to the user information. For the sake of simplification of description, the user information is divided in 2-byte units. In the aspect of improving security, however, it is preferable to further divide user information in detail such that each divided information will not have any meaning.

The information dividing part 40 may change the order of divided pieces of user information. For example, it is possible to change the order of divided information using hash functions. Thus, the divided pieces of user information, i.e. "P", "G", "R", "3", "5", "M", are permutated with "T", "R3", "M", "G", "P", "5". In addition, it is possible to change the rule of changing the order of divided information for each user information. According to the rule for storing each piece of divided information normally with the same edge terminal device 1x, for example, it is possible to enhance difficulty of readability by a third party even when a third party captures a rule of determining destinations of divided information.

In addition, it is possible for the information dividing part 40 to generate parity data in preparation for destruction or robbery of the edge terminal device 1x serving as one destination. In the edge terminal device 1A, the information dividing part 40A generates multiple pieces of divided information based on user information so as to store each piece of divided information, assigned an identification indicating the correlation to the same user information, with the storage unit 80A. In the case of the above user information, for example, multiple pieces of divided data, i.e. "P", "G", "T", "R", "3", "5", "M", are assigned the same identification for recording.

Referring back to FIG. 4, the storage controller 60A generates a data map (step S19). The data map is information for correlating divided information and destinations. Specifically, the storage controller 60A reads a destination selected by the destination determination part 50A and divided information assigned an identification generated by the information dividing part 40A from the storage unit 80A so as to store the divided information and its destination with one-to-one correlation in the storage unit 80A. In the case of the above user information, a first piece of divided information, i.e. "P", is stored in the storage unit 80A in correspondence with the edge terminal device 1B while a second piece of divided information, i.e. "G", is store in the storage unit 80A in correspondence with the edge terminal device 1C. The correlation between divided information and its destination is determined according to an arbitrary rule.

According to the above "destination selecting method based on network communication speed" for selecting destinations, the divided information having the maximum size is stored in the edge terminal device 1A. According to the above "dividing method using category" for diving the user information into "PGTR", "35", "M", the divided information "PGTR" is correlated to the edge terminal device 1A and then recorded on a data map. In addition, the storage controller 60A stores a sorting rule for the divided information of the information dividing part 40A in the storage unit 80A in correspondence with a data map.

Upon completion of generating a data map, the storage controller 60A sequentially transmits all pieces of divided information to their destinations, i.e. the edge terminal devices 1x, via the communication part 70A based on the correlation of a data map (step S20). The storage controller 60A determined whether or not to complete transmitting all pieces of divided information with respect to the entirety of user information. The storage controller 60A repeats data transmission when it does not complete transmission of the divided information (step S21: NO). Upon completion of data transmission, the storage controller 60A sends a transmission completion signal to all the destinations, thus exiting the distributed storage process.

Multiple pieces of divided information, which are distributed and stored at multiple destinations, are held by their destinations until they are transmitted to the server terminal device 3. Thereafter, at the predetermined timing (e.g. once in several hours), the storage controller 60x at each destination of the edge terminal device 1x transmits the divided information, which has been stored therein for a predetermined period of time (e.g. a period of time counted from the timing of transmitting previous divided information to the server terminal device 3 to the current timing), and its data map to the server terminal device 3. The server terminal device 3 restores multiple pieces of divided information to original user information based on data maps so as to store the original user information therein. The server terminal device 3 constructs a new analysis rule using the user information which is acquired from the edge terminal device 1 and then restore therein.

Figure 5:
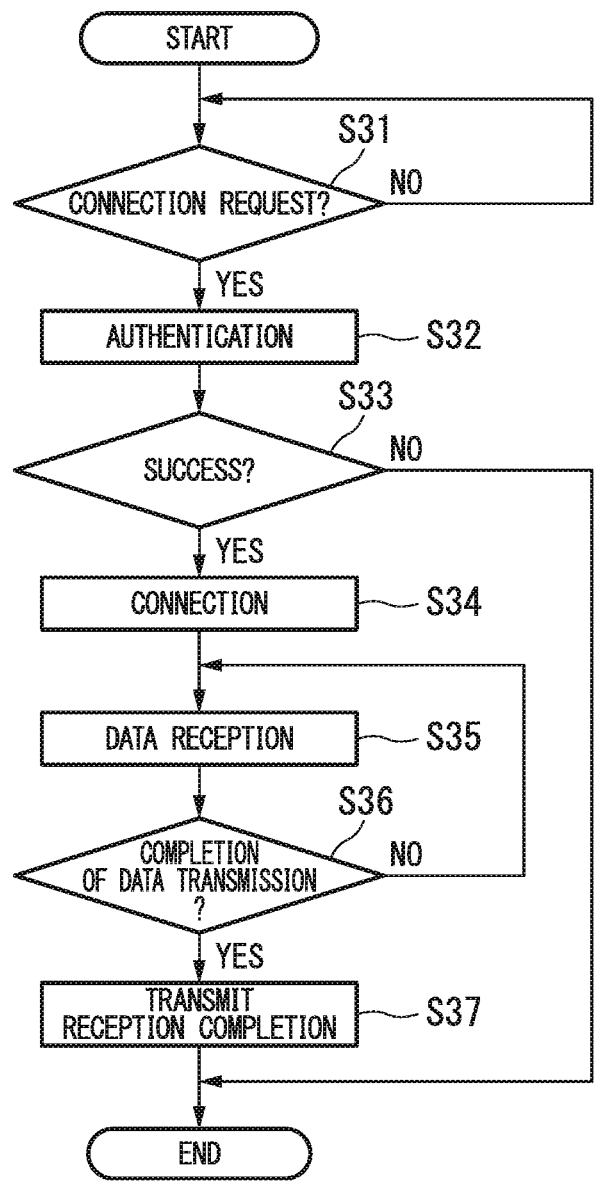
FIG. 5 is a flowchart showing a reception process of divided information with the edge terminal device according to the embodiment of the present invention.

FIG. 5 is a flowchart showing a reception process of divided information implemented by an edge terminal device according to the present embodiment. The following description refers to the edge terminal device 1A configured to transmit divided information and the edge terminal device 1B configured to receive divided information.

First, the communication part 70B of the edge terminal device 1B determines the existence/absence of a connection request given by the edge terminal device 1A (step S31). Without receiving any connection request (step S31: NO), the communication part 70B waits for a connection request. Upon receiving a connection request (step S31: YES), the communication part 70B requests and receives authentication information from the edge terminal device 1A. The edge terminal device 1B authenticates the edge terminal device 1A based on the authentication information (step S32). The edge terminal device 1B exits the reception process when it fails in authentication (step S33: NO). Upon a success in authentication (step S33: YES), the communication part 70B connects to the edge terminal device 1A (step S34). Next, the storage controller 60B receives the divided information from the edge terminal device 1A via the communication part 70B (step S35). Thereafter, the storage controller 60B determines whether to complete data reception (step S36). The storage controller 60B determines that data reception have not been completed (step S36: NO) until it receives a transmission completion signal from the edge terminal device 1A, thus continuously receiving the divided information from the edge terminal device 1A. Upon receiving a transmission completion signal from the edge terminal device 1A, the storage controller 60B determines that data transmission has been completed (step S36: YES), thus sending a reception completion signal to the edge terminal device 1A (step S37).

The present embodiment divides personal information so as to distribute and store multiple pieces of divided information with a plurality of edge terminal devices located in proximate to users in the situation that enormous amounts of data such as video data need to be transferred, real-time response is required, and personal information is included in transferring data, i.e. the situation of providing network services which are inappropriate to be processed via server terminal devices located in the cloud side of cloud computing; hence, it is possible to improve security performance. According to the present embodiment, the distributed storage process of divided information confirms the existence of cooperative edge terminal devices and selects destinations based on network communication speed or free space of storage; hence, it is possible to appropriately select destinations and to store divided information at destinations depending on any change in the arrangement of edge terminal devices and the number of edge terminal devices as well as any change in configurations of network systems.

The above description refers to the situation of directly distributing multiple pieces of divided information and then storing them at multiple destinations, whereas it is possible to encrypt and store divided information at destinations. In addition, it is possible to store single divided information in a redundant manner with a plurality of edge terminal devices. Alternatively, it is possible to virtualize storage units of edge terminal devices by way of a file system, thus having each edge terminal device recognized as a single storage area. In this case, it is unnecessary for the edge terminal device 1A to select destinations in the situation, like the above example, that the edge terminal device 1A distributes and stores user information with a plurality of edge terminal devices 1x. In addition, it is unnecessary to change destinations irrespective of any change occurring in the number of edge terminal devices included in a network system.

The above description refers to the situation that multiple pieces of divided information are generated by dividing user information, which is obtained by analyzing video data, are distributed and stored with a plurality of edge terminal devices, whereas it is possible to divide part of video data or the entirety of vide data into multiple pieces of data so as to distribute and store then with a plurality of edge terminal devices.

The aforementioned processes can be descried using programs and stored in computer-readable storage media since the present embodiment refers to an edge terminal device including a computer system. That is, the computer system implements the aforementioned processes by reading and executing programs on storage media. Herein, computer-readable storage media refer to magnetic disks, magneto-optical disks, CD-ROM, DVD-ROM, semiconductor memory, and the like. In addition, it is possible to distribute programs to computer systems through communication lines, thus having computer systems execute programs.

The above programs may embody part of functionality of the above edge terminal device. Alternatively, it is possible to use differential files (or differential programs) which can embody the above functionality in combination with other programs pre-installed in computer systems.

The present invention is not necessarily limited to the foregoing embodiment; hence, it is possible to replace constituent elements of the embodiment with known constituent elements without departing from the scope of the subject matter of the invention. For example, video data is not necessarily limited to moving-image data, in other words, video data may refer to audio data and still-image data. In addition, edge terminal devices are regarded as an example of an information processing device while user information is regarded as an example of information stored in an information processing device.

INDUSTRIAL APPLICABILITY

The present invention is designed to divide user information into multiple pieces of divided information so as to distribute and store them with a plurality of edge terminal devices in a network system connecting a plurality of edge terminal devices connectible to a plurality of end terminal devices, wherein the present invention is applicable to various types of network configurations and various types of information processing systems.

REFERENCE SIGNS LIST 1 edge terminal device
2 end terminal device
3 server terminal device
10 information acquisition part
20 information extraction part
30 information provider
40 information dividing part
45 state information acquisition part
50 destination determination part
60 storage controller
70 communication part
80 storage unit

The invention claimed is:

1. A cooperative distributed storage system comprising at least one processor and a plurality of information processing devices mutually connected together via a network system in connection with a server terminal device, each information processing device among the plurality of information processing devices being configured to carry out a distributed storage process via (i) through (v) of
   (i) receiving user information from an external device configured to sense a user, wherein the user information includes personal information of the user relating to a plurality of categories and user behavior information relating to a behavior of the user;
   (ii) dividing the user information into a plurality of divided information by the plurality of categories;
   (iii) acquiring state information representative of the state of the network system;
   (iv) dynamically selecting a plurality of destinations used to store the plurality of divided information among the plurality of information processing devices based on the state information of the network system; and
   (v) storing the plurality of divided information in the plurality of destinations, wherein different authentication methods are used for mutual authentication between the plurality of information processing devices, and wherein the plurality of destinations are selected from among a predetermined number of information processing devices adopting the same authentication method.

2. The cooperative distributed storage system according to claim 1, wherein the state information of the network system represents communication speed of the network system such that the plurality of destinations are selected from among the plurality of information processing devices connected to the network system having high communication speed.

3. The cooperative distributed storage system according to claim 1, wherein the state information of the network system represents a physical distance between adjacent information processing devices among the plurality of information processing devices such that the plurality of destinations are selected from among the plurality of information mutually distanced from each other by a predetermined distance or more.

4. The cooperative distributed storage system according to claim 1, wherein the state information of the network system represents a free space of the storage included in each information processing device among the plurality of information processing devices such that the plurality of destinations are selected from the plurality of information processing devices having large free spaces.

5. The cooperative distributed storage system according to claim 1, wherein the user information is divided by each category and further divided by a predetermined data size into the plurality of divided information.

6. The cooperative distributed storage system according to claim 1, wherein the user information is extracted from video data produced by the external device configured to capture an image of the user.

7. The cooperative distributed storage system according to claim 6 wherein each information processing device is further configured to:
   generate a data map representing a correlation between each divided information and its destination; and transmit the data map and the plurality of divided information to the server terminal device,
   wherein the server terminal device receives the data map and the plurality of divided information from the plurality of information processing devices so as to restore the user information based on the data map.

8. The cooperative distributed storage system according to claim 1, wherein each information processing device is further configured to provide provider information suited to the user information to the external device.

9. An information processing method adapted to a cooperative distributed storage system comprising a plurality of information processing devices mutually connected together via a network system in connection with a server terminal device, comprising:

receiving user information from an external device configured to sense a user, wherein the user information includes personal information of the user relating to a plurality of categories and user behavior information relating to a behavior of the user;

dividing the user information into a plurality of divided information by the plurality of categories;

acquiring state information representative of the state of the network system;

dynamically selecting a plurality of destinations used to store the plurality of divided information among the plurality of information processing devices based on the state information of the network system; and storing the plurality of divided information in the plurality of destinations, wherein different authentication methods are used for mutual authentication between the plurality of information processing devices, and wherein the plurality of destinations are selected from among a predetermined number of information processing devices adopting the same authentication method.

10. A non-transitory computer-readable storage medium having stored therein a computer program causing a computer to implement the information processing method according to claim 9.

11. The information processing method according to claim 9, wherein each information processing device is further configured to provide provider information suited to the user information to the external device.

* * * * *